US011171824B2

(12) United States Patent
Jones et al.

(10) Patent No.: US 11,171,824 B2
(45) Date of Patent: Nov. 9, 2021

(54) CONFIGURATION OF COMPUTING DEVICES VIA CONTAINERS

(71) Applicant: Red Hat, Inc., Raleigh, NC (US)

(72) Inventors: Matthew W. Jones, Durham, NC (US); Steven S. McDonald, Trenton, NJ (US); William E. Nottingham, Durham, NC (US); Alan S. Rominger, Durham, NC (US); Ryan Petrello, Atlanta, GA (US)

(73) Assignee: Red Hat, Inc., Raleigh, NC (US)

( * ) Notice: Subject to any disclaimer, the term of this patent is extended or adjusted under 35 U.S.C. 154(b) by 335 days.

(21) Appl. No.: 15/909,128

(22) Filed: Mar. 1, 2018

(65) Prior Publication Data

US 2019/0273655 A1 Sep. 5, 2019

(51) Int. Cl.
*H04L 12/24* (2006.01)
*G06F 21/44* (2013.01)
(Continued)

(52) U.S. Cl.
CPC ........... *H04L 41/0806* (2013.01); *G06F 8/65* (2013.01); *G06F 9/44568* (2013.01);
(Continued)

(58) Field of Classification Search
CPC ............ H04L 41/0806; H04L 41/0886; H04L 67/34; H04L 63/08; G06F 8/65;
(Continued)

(56) References Cited

U.S. PATENT DOCUMENTS 9,178,925 B2 11/2015 Li et al.
9,811,451 B1 11/2017 Arguelles et al.
(Continued)

FOREIGN PATENT DOCUMENTS

| CN | 105245371 A | 1/2016 | |
|---|---|---|---|
| CN | 106936636 A | 7/2017 | |
| WO | WO-2018005297 A1 * | 1/2018 | ............. G06Q 10/06 |

OTHER PUBLICATIONS

Bruhiere, Xavier, "Provisioning Docker containers with Ansible: Setting up and extending an Ansible environment with playbooks, plugins, and the Docker module," developerWorks, IBM Corporation, Sep. 3, 2015, 13 pages, https://www.ibm.com/developerworks/cloud/library/cl-provision-docker-containers-ansible/cl-provision-docker-containers-ansible-pdf.pdf.

(Continued)

*Primary Examiner* — Kevin T Bates
*Assistant Examiner* — Lesa M Kennedy
(74) *Attorney, Agent, or Firm* — Withrow & Terranova, PLLC (57) ABSTRACT

Configuration of computing devices via containers is disclosed. A container image is accessed from a container image storage. A first container is initiated, into a container environment, from the container image with a first runtime variable. The first runtime variable identifies a first operational script of a first plurality of operational scripts, the first operational script identifying configuration actions to be performed on a plurality of managed computing devices. The container image comprises an execution layer that causes execution of a configurator. The configurator is configured to receive the first runtime variable, access the first operational script of the first plurality of operational scripts identified by the first runtime variable, perform the configuration actions identified in the first operational script on at least some of the plurality of managed computing devices, and communicate, outside of the first container, output results that identify an outcome of the configuration actions.

17 Claims, 6 Drawing Sheets

(51) Int. Cl.
*G06F 9/445* (2018.01)
*G06F 9/455* (2018.01)
*G06F 8/65* (2018.01)

(52) U.S. Cl.
CPC .......... *G06F 9/45558* (2013.01); *G06F 21/44* (2013.01); *H04L 41/0886* (2013.01); *G06F 2009/45562* (2013.01)

(58) Field of Classification Search
CPC .. G06F 9/44568; G06F 9/45558; G06F 21/44; G06F 2009/45562; G06F 8/60; G06F 9/445; G06F 9/5077
See application file for complete search history.

(56) References Cited

U.S. PATENT DOCUMENTS

| | | | |
|---|---|---|---|
| 9,916,233 B1* | 3/2018 | Qureshi | G06F 11/3692 |
| 2005/0060722 A1* | 3/2005 | Rochette | G06F 8/60 |
| | | | 719/319 |
| 2012/0030672 A1* | 2/2012 | Zygmuntowicz | G06F 8/60 |
| | | | 718/1 |
| 2016/0350105 A1* | 12/2016 | Kumar | G06F 8/20 |
| 2017/0034012 A1 | 2/2017 | Nickolov et al. | |
| 2017/0212830 A1* | 7/2017 | Thomas | G06F 8/63 |
| 2018/0285156 A1* | 10/2018 | Corey | G06F 9/4843 |

OTHER PUBLICATIONS

Evin, "Using ansible to build and orchestrate clean docker images," Cloud Antics, Jun. 14, 2016, 11 pages, https:// tech.napsty.com/2016/06/using-ansible-to-build-and-orchestrate-clean-docker-images.html.

Msv, Janakiram, "Lightning Fast Container Provisioning with Microsoft's Azure Container Instances," The New Stack, Aug. 18, 2017, 7 pages, https://thenewstackio/lightning-fast-container-provisioning-with-microsoftsazure-container-instances/.

* cited by examiner

```
FROM centos:7
# Install Configurator (Ansible Runner)
RUN yum -y update && yum -y install epel-release && \
    yum -y install ansible python-psutil python-pip bubblewrap bzip2 python-crypto
RUN pip install python-memcached wheel pexpect psutil python-daemon
ADD dist/ansible_runner-1.0-py2.py3-none-any.whl /ansible_runner-1.0-py2.py3-none-any.whl
RUN pip install /ansible_runner-1.0-py2.py3-none-any.whl
ADD playbooks /runner/playbooks
ADD env /runner/env
ADD inventory /runner/inventory
VOLUME /runner/playbooks
VOLUME /runner/env
VOLUME /runner/inventory
VOLUME /runner/artifacts
ENTRYPOINT ["/init", "--"]
CMD configurator --command=start --private_data_dir=/runner
```

54-1, 54-2, 54-3, 54-4, 54-5, 54-6 — 52

```
docker run -e RUNNER_PLAYBOOK=upgradedb.yml -e RUNNER_JOB_TIMEOUT=300 -e RUNNER_FILTER=databases \
  --mount source=playbookvols,target=/runner/playbooks ansible/runner:1.0
```

CONFIGURATION OF COMPUTING DEVICES VIA CONTAINERS

TECHNICAL FIELD

The examples relate generally to computing device configuration, and in particular configuration of computing devices via containers.

BACKGROUND

Containerization technologies are increasingly popular due to their relatively low resource requirements compared to other process isolation mechanisms, such as virtual machines. Entities that utilize container technologies often prefer that all processes executed in a computing environment be capable of being containerized and run as containers.

SUMMARY

The examples herein implement configuration of computing devices via containers. The examples facilitate a containerized configurator that is capable of receiving runtime variables that identify a particular operational script of a plurality of different operational scripts that identify configuration actions to be performed on a plurality of managed computing devices. The containerized configurator generates output that is persistent even after the container terminates.

In one example, a method is disclosed. The method includes accessing a container image from a container image storage. The method further includes initiating, into a container environment, a first container from the container image with a first runtime variable, the first runtime variable identifying a first operational script of a first plurality of operational scripts, the first operational script identifying configuration actions to be performed on a plurality of managed computing devices. The container image comprises an execution layer that causes execution of a configurator. The configurator is to receive the first runtime variable, access the first operational script of the first plurality of operational scripts identified by the first runtime variable, perform the configuration actions identified in the first operational script on at least some of the plurality of managed computing devices, and communicate, outside of the first container, output results that identify an outcome of the configuration actions.

In another example a computing device is provided. The computing device includes a memory and a processor device coupled to the memory. The processor device is to access a container image from a container image storage and is to initiate, into a container environment, a first container from the container image with a first runtime variable, the first runtime variable identifying a first operational script of a first plurality of operational scripts, the first operational script identifying configuration actions to be performed on a plurality of managed computing devices. The container image comprises an execution layer that causes execution of a configurator. The configurator is to receive the first runtime variable, access the first operational script of the first plurality of operational scripts identified by the first runtime variable, perform the configuration actions identified in the first operational script on at least some of the plurality of managed computing devices, and communicate, outside of the first container, output results that identify an outcome of the configuration actions.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first runtime variable" and "second runtime variable," and does not imply a priority, a type, an importance, or other attribute, unless otherwise stated herein. As used herein and in the claims, the articles "a" and "an" in reference to an element refers to "one or more" of the element unless otherwise explicitly specified.

Containerization technologies, such as, by way of non-limiting example, Docker container technology, Kubernetes container technology, CoreOS (Rocket) container technology, Tectonic container technology, and the like, are increasingly popular due, in part, to their relatively low resource requirements compared to other process isolation mechanisms, such as virtual machines. Entities that utilize container technologies often prefer that all processes executed in a computing environment be capable of being containerized and run as containers.

IT automation technologies that are capable of configuring large numbers of computing devices in an orderly and consistent manner are also increasingly popular as the sizes of data centers increase. Installing software upgrades on hundreds of host computing devices, for example, if done manually by a human is fraught with the potential for human error, can be extremely time-consuming, and requires relatively skilled labor, increasing costs.

IT automation technologies, such as the Red Hat Ansible Tower technologies, available from Red Hat, Inc., Raleigh, N.C., are designed to implement IT automation, such as configuration and the like, on large numbers of computing devices. However, such automation technologies typically involve a number of different executing processes, some of which may be executing in the background on a relatively on-going basis, and do not lend themselves to an isolated environment in a container.

The examples herein implement configuration of computing devices via containers. The examples facilitate a containerized configurator that is capable of receiving runtime variables that identify a particular operational script of a plurality of different operational scripts that identify configuration actions to be performed on a plurality of managed computing devices. The containerized configurator generates output that is persistent even after the container terminates. The examples thus, among other advantages, eliminate a need to have a task executing in the background for long periods of time, and implement a containerized configurator wherein the same containerized configurator can be executed for myriad different configuration tasks, all within a container environment and using container infrastructure such as container schedulers and/or orchestrators. The examples thus eliminate a need to manage both a containerized environment for certain tasks, and a non-containerized environment for IT automation tasks.

Figure 1:
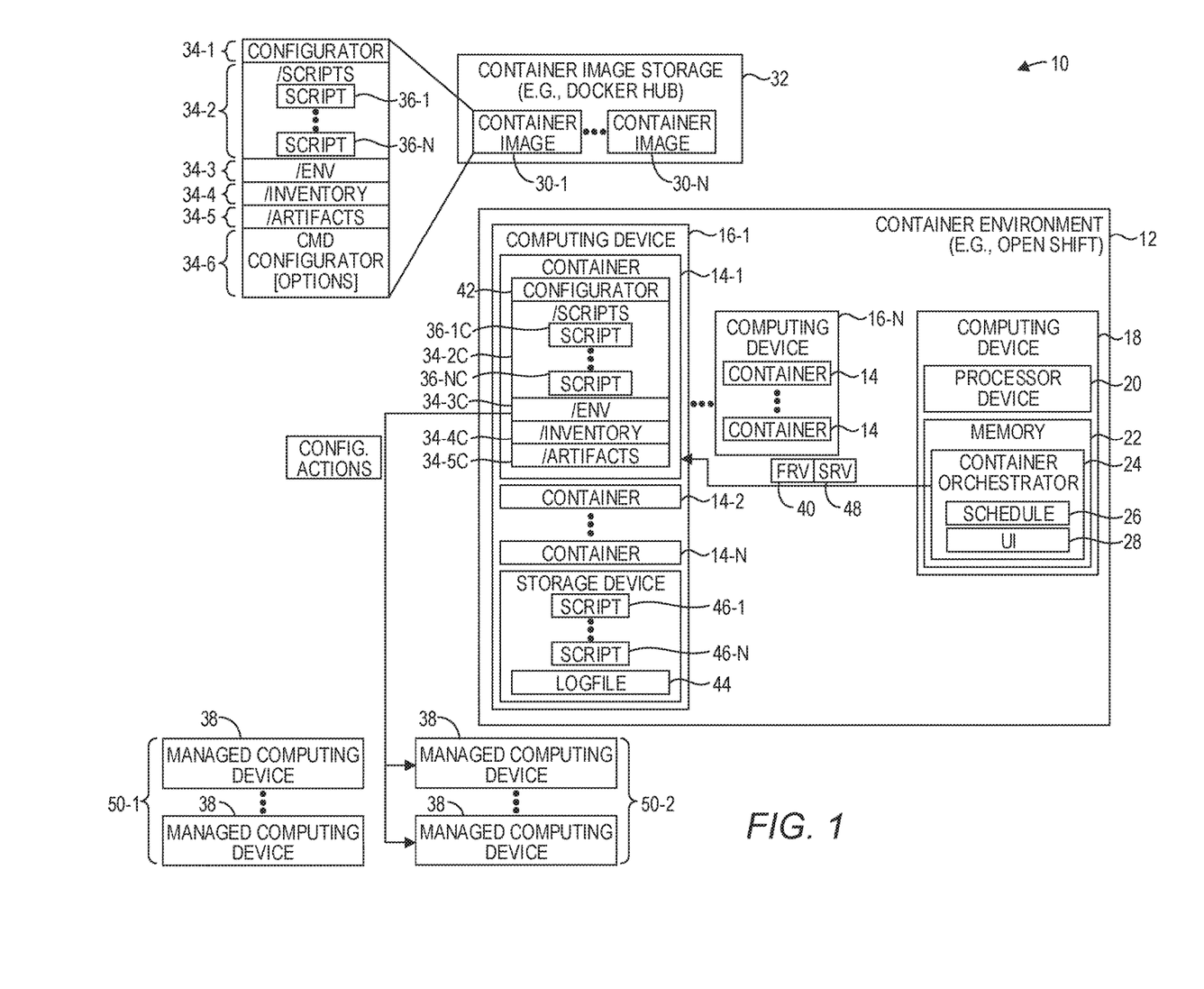
FIG. 1 is a block diagram of an environment in which examples may be practiced.

FIG. 1 is a block diagram of an environment 10 in which examples may be practiced. The environment 10 includes a container environment 12 that initiates containers 14, 14-1-14-N (generally, containers 14) among a plurality of computing devices 16-1-16-N (generally, computing devices 16). The container environment 12 may comprise any containerization technology or containerization technologies, such as, by way of non-limiting example, Open Shift, Docker, Kubernetes, or the like. While for purposes of illustration only a few containers 14 are illustrated, in operation, the container environment 12 may have hundreds or thousands of containers 14 executing at any given time. Similarly, while for purposes of illustration only a few computing devices 16 are illustrated, in operation, the container environment 12 may have hundreds or thousands of computing devices 16. In some examples, the container environment 12 is implemented in a cloud computing environment, such as, by way of non-limiting example, an Amazon Web Services (AWS) or Microsoft Azure cloud computing environment.

The environment 10 also includes a computing device 18 that has a processor device 20 and a memory 22. It should be noted that the computing devices 16 also include processor devices and memories, which are not illustrated solely for purposes of emphasizing other aspects of the computing devices 16. The memory 22 includes a container orchestrator 24, that, in some examples, is responsible for initiating the containers 14 in the container environment 12. The container orchestrator 24 may initiate containers 14 automatically, based on a criterion such as resource utilization, network utilization, or some other predetermined criterion, or, based on a schedule 26 that may identify certain dates and times that the container orchestrator 24 should initiate one or more containers 14. The container orchestrator 24 may also initiate one or more containers 14 in response to input received via a user interface 28.

It should be noted that, because the container orchestrator 24 is a component of the computing device 18, functionality implemented by the container orchestrator 24 may be attributed to the computing device 18 generally. Moreover, in examples where the container orchestrator 24 comprises software instructions that program the processor device 20 to carry out functionality discussed herein, functionality implemented by the container orchestrator 24 may be attributed herein to the processor device 20.

To initiate a container 14, at least for the first time, the container orchestrator 24 accesses a container image 30-1-30-N (generally, container images 30) in a container image storage 32. A container image 30 includes a plurality of layers. Each layer is generated in response to a command used during a build process of a corresponding container image 30. The layers may contain, for example, data files, executable files, commands that are to be executed when a container 14 is initiated from the container image 30, and the like. Each container image 30 typically differs from other container images 30, and contains those resources necessary for the respective container image 30 to implement a desired functionality.

The examples disclosed herein utilize the container image 30-1. In one example, the container image 30-1 includes a plurality of layers 34-1-34-6 (generally, layers 34). A configurator layer 34-1 contains the executable codefile(s) that implement the configurator functionality described herein. In one example, the configurator functionality implements functionality substantially similar to Ansible Tower, available from Red Hat, Inc.; however, the examples are not limited to any particular configurator and have applicability to any IT automation and configuration system. An operational script layer 34-2 contains operational scripts 36-1-36-N (generally, operational scripts 36). Each operational script 36 identifies one or more configuration actions to be performed on a plurality of managed computing devices 38, and is accessed by a configurator to implement the configuration actions on one or more of the plurality of managed computing devices 38. It should be noted that while the managed computing devices 38 are illustrated as being outside of the container environment 12 solely for purposes of illustration, in other examples, the managed computing devices 38 may be within the container environment 12 and may comprise, for example, one or more of the computing devices 16. In some examples, the operational scripts 36 comprise Ansible Raybooks, written in accordance with a predetermined syntax, as described at ansible.docs.com. While only four managed computing devices 38 are illustrated, in practice, the environment 10 may include tens, hundreds, or thousands of managed computing devices 38. The managed computing devices 38 may comprise any type of computing device, including, for example, computer server computing devices, network switch computing devices, or the like.

The layer 34-3 may contain a directory of credentials, such as Secure Shell (SSH) credentials, user identifier and password credentials, and the like. The layer 34-4 may contain inventory information that specifically identifies the managed computing devices 38 such as by name, Internet Protocol (IP) address, or the like. The layer 34-5 may contain various miscellaneous files, and may contain output files where output from the configurator may be directed. An execution layer 34-6 includes a command that initiates the configurator when a container 14 is initiated from the container image 30-1.

As an example of the configuration of the managed computing devices 38 via a container 14, assume that the container orchestrator 24 is directed to initiate a container 14 from the container image 30-1. In this example, the direction may come via the user interface 28, or via the schedule 26, and includes a first runtime variable 40 that identifies the operational script 36-1 as the operational script 36 to be processed against the managed computing devices 38. The container orchestrator 24 accesses the container image 30-1 from the container image storage 32. The container orchestrator 24 initiates, into the container environment 12, the container 14-1 from the container image 30-1 with the first runtime variable 40, which identifies the operational script 36-1. As part of the initiation of the container 14-1, the data layers 34-2-34-5 are copied to a local location as layers 34-20-34-50. The script layer 34-2C includes operational script copies 36-1C-36-NC of the operational scripts 36-1-36-N. The initiation of the container 14-1 causes the execution of the execution layer 34-6, which initiates, from the configurator layer 34-1, a runtime configurator 42.

The configurator 42 is configured to receive the first runtime variable 40 and access the operational script 36-1C identified by the first runtime variable 40. The configurator 42 performs the configuration actions identified in the operational script 36-1C on at least some of the plurality of managed computing devices 38. The configurator 42 communicates, outside of the container 14-1, output results that identify an outcome of the configuration actions. For example, the output results may be written to a logfile 44. The container 14-1 may then terminate.

Merely as an example, the configuration actions may comprise actions that install, on at least some of the managed computing devices 38, a software package upgrade of a software package previously installed on the managed computing devices 38. In this example, the operational script 36-1C may identify configuration actions that cause the configurator 42 to connect to each respective managed computing device 38, provide authentication information to each respective managed computing device 38 that authenticates the container 14-1 to the respective managed computing device 38, and upgrade the software package previously installed on the respective managed computing device 38.

As another example, the managed computing devices 38 may comprise a plurality of network switches, and the operational script 36-1C identifies configuration actions that cause the configurator 42 to update network routing tables in the various managed computing devices 38. In particular, the configuration actions may cause the configurator 42 to connect to each managed computing device 38, provide authentication information to each respective managed computing device 38 that authenticates the container 14-1 to the respective managed computing device 38, and install the network routing table on the respective managed computing device 38.

In another example, it may be desired to initiate a container 14 to utilize a particular operational script 46-1-46-N that is stored in a location outside of the container image 30-1. In this example, the container orchestrator 24 may initiate the container 14-1 from the container image 30-1 with the first runtime variable 40, which, in this example, identifies the operational script 46-1, stored outside the container 14-1, and a second runtime variable 48. The second runtime variable 48 identifies a file directory outside of the container 14-1 that contains the plurality of operational scripts 46. The phrase "first runtime variable" and "second runtime variable" refer to options permitted in the particular container environment 12 when initiating a container 14. As an example, in a Docker environment, the first runtime variable 40 and the second runtime variable 48 may comprise any suitable option that can be used with the Docker run command. In the example above, the first runtime variable 40 may be an environment variable that is accessed inside the container 14-1, and that is used to determine a particular script to access. The second runtime variable 48 may comprise a "mount" option or other suitable option that alters the location of a directory used by the container 14-1.

In another example, the container image 30-1 may not include the script layer 34-2, and each initiation of a container 14-1 from the container image 30-1 includes the runtime variables 40, 48 that identify a particular operational script 46 of the plurality of operational scripts 46 that are maintained outside of the container image 30-1.

In another example, it may be desired to initiate an operational script 36 or an operational script 46 against a subset of the managed computing devices 38. For example, a subset 50-1 of the managed computing devices 38 may be database server management computing devices 38, and a subset 50-2 of the managed computing devices 38 may be application server managed computing devices 38. The inventory layer 34-4 may identify all the managed computing devices 38 in both subsets. Assume that it is desired to implement the operational script 36-1 against only the database server managed computing devices 38 in the subset 50-1. The container orchestrator 24 initiates the container 14-1 from the container image 30-1 with the first runtime variable 40, which, in this example, identifies the operational script 36-1, and the second runtime variable 48, which, in this example, is an environment variable "RUNNER_FILTER" set to a value of "DATABASE". The configurator 42 receives the first runtime variable 40 and the second runtime variable 48, and accesses the operational script 36-1 identified by the first runtime variable 40. The configurator 42 accesses the environment variable "RUNNER_FILTER", and determines that the value is "DATABASE". The configurator 42 accesses the inventory layer 34-40, and determines based on information in the inventory layer 34-40 that the managed computing devices 38 in the subset 50-1 of managed computing devices 38 are database server managed computing devices 38. The configurator 42 performs the configuration actions identified in the operational script 36-1 on the subset 50-1 of database server managed computing devices 38.

In another example, it may be desirable to initiate the container 14-1 from the container image 30-1 with credential information, such as a password, for use in authentication of the container 14-1 with the managed computing devices 38. In this example, the container orchestrator 24 initiates the container 14-1 from the container image 30-1 with the first runtime variable 40, which, in this example, identifies the operational script 36-1, and the second runtime variable 48, which, in this example, is an environment variable "PASSWORD" set to a value of "W#$R$TGz". The configurator 42 receives the first runtime variable 40 and the second runtime variable 48 and accesses the operational script 36-1 identified by the first runtime variable 40. The configurator 42 then provides the password "W#$R$TGz" to the plurality of managed computing devices 38 to authenticate the container 14-1 to the plurality of managed computing devices 38, and performs the configuration actions identified in the operational script 36-1 on the plurality of managed computing devices 38.

Figure 2:
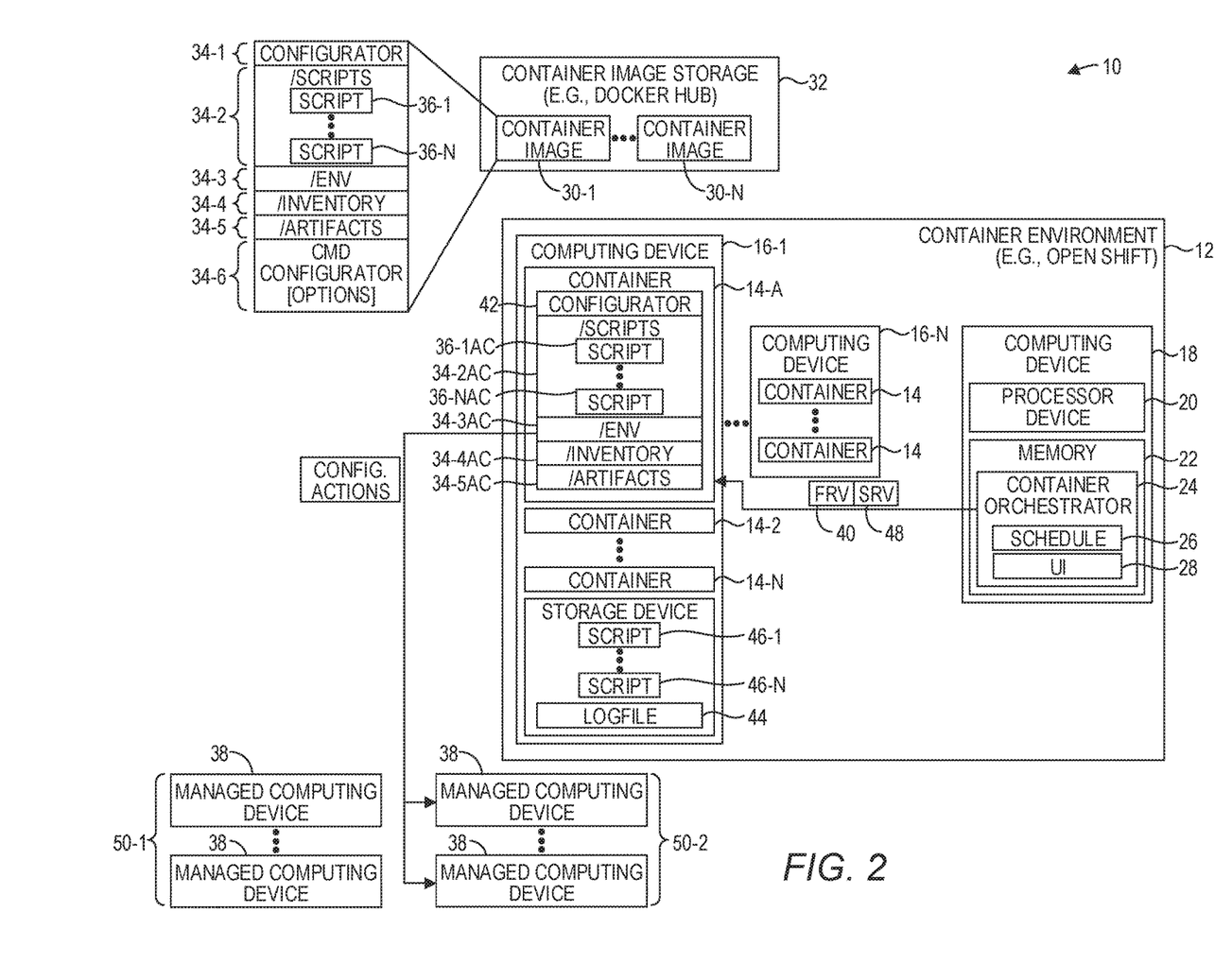
FIG. 2 is a block diagram illustrating the environment at a subsequent point in time to that illustrated in FIG. 1.

FIG. 2 is a block diagram illustrating the environment 10 at a subsequent point in time to that illustrated in FIG. 1. In this example, the container 14-1 has finished performing the configuration actions identified in the operational script 36-1 on the plurality of managed computing devices 38 and has communicated, outside of the container 14-1, the output results that identify the outcome of the configuration actions.

The container orchestrator 24 is then directed to initiate a container 14-A from the container image 30-1 to initiate a different operational script 36-N against at least some of the managed computing devices 38. The container orchestrator 24 accesses the container image 30-1 from the container image storage 32. The container orchestrator 24 initiates, into the container environment 12, the container 14-A from the container image 30-1 with the first runtime variable 40, which identifies the operational script 36-N. As part of the initiation of the container 14-1, the data layers 34-2-34-5 are copied to a local location as layers 34-2AC-34-5AC. The script layer 34-2AC includes operational script copies 36-1AC 36-NAC of the operational scripts 36-1-36-N.

The configurator 42 is configured to receive the first runtime variable 40 and access the operational script 36-NAC identified by the first runtime variable 40. The configurator 42 performs the configuration actions identified in the operational script 36-NAC on at least some of the plurality of managed computing devices 38. The configurator 42 communicates, outside of the container 14-A, output results that identify an outcome of the configuration actions. For example, the output results may be written to the logfile 44. The container 14-A may then terminate. Thus, the container orchestrator 24 can initiate any number of containers 14 successively, or in parallel, to perform different operational scripts 36 against different sets of managed computing device 38, without having to regenerate the container image 30-1.

Figure 3:
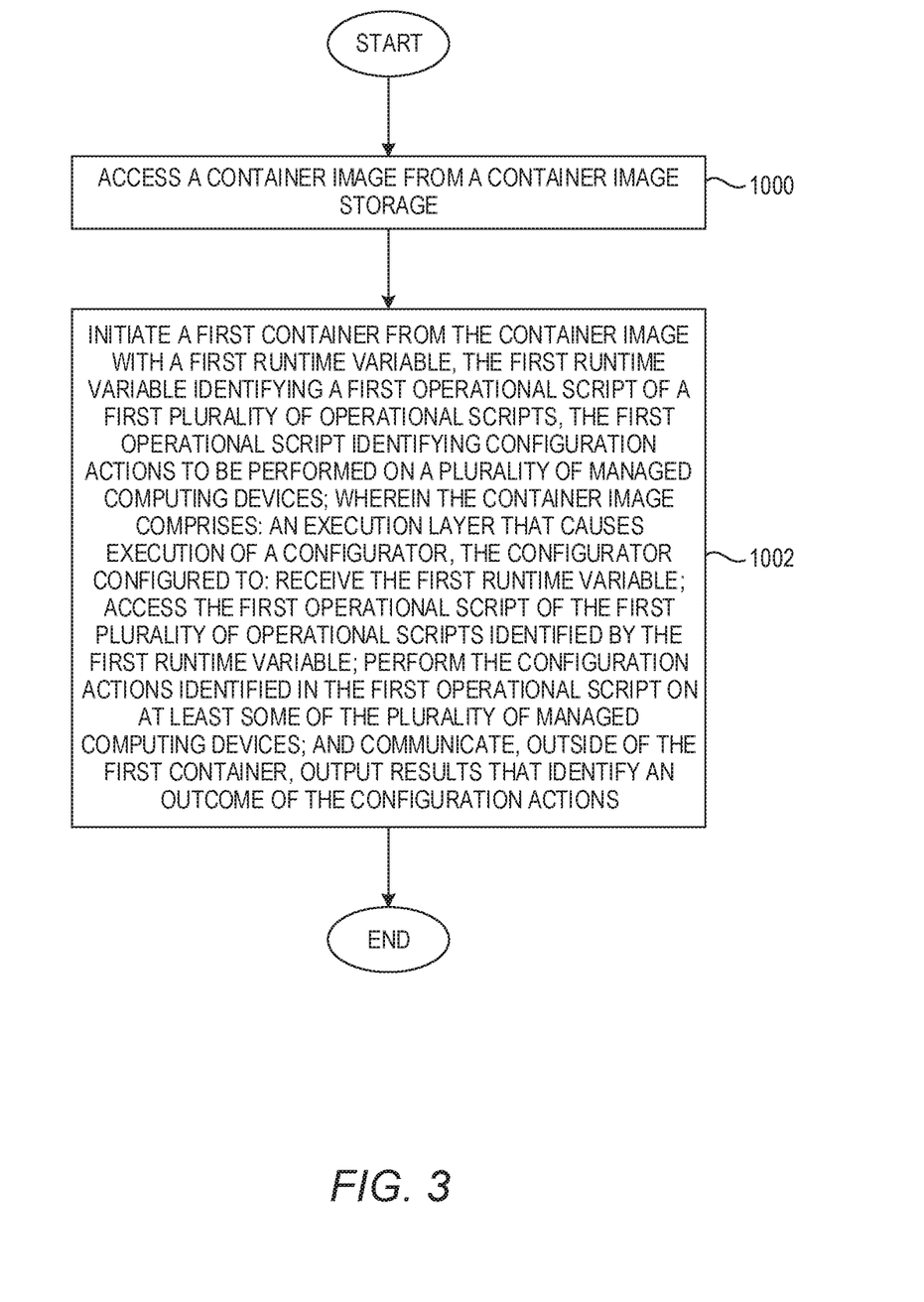
FIG. 3 is a flowchart of a method for configuration of computing devices according to one example.

FIG. 3 is a flowchart of a method for configuration of computing devices according to one example. FIG. 3 will be discussed in conjunction with FIG. 1. Assume again for purposes of discussion that the container orchestrator 24 determines, based on the schedule 26, that it is time to initiate a container 14 from the container image 30-1 to initiate the configuration actions identified in the operational script 36-1 against the managed computing devices 38. The container orchestrator 24 accesses the container image 30-1 from the container image storage 32 (FIG. 3, block 1000). The container orchestrator 24 initiates, into the container environment 12, the container 14-1 from the container image 30-1 with the first runtime variable 40, which identifies the operational script 36-1. As part of the initiation of the container 14-1, the data layers 34-2-34-5 are copied to the local location as the layers 34-2C-34-5C. The script layer 34-2C includes the operational script copies 36-1C-36-NC of the operational scripts 36-1-36-N.

The configurator 42 is configured to receive the first runtime variable 40 and access the operational script 36-1C identified by the first runtime variable 40. The configurator 42 performs the configuration actions identified in the operational script 36-1C on at least some of the plurality of managed computing devices 38. The configurator 42 communicates, outside of the container 14-1, output results that identify an outcome of the configuration actions. For example, the output results may be written to a logfile 44 (FIG. 3, block 1002). The container 14-1 may then terminate.

Figure 4:
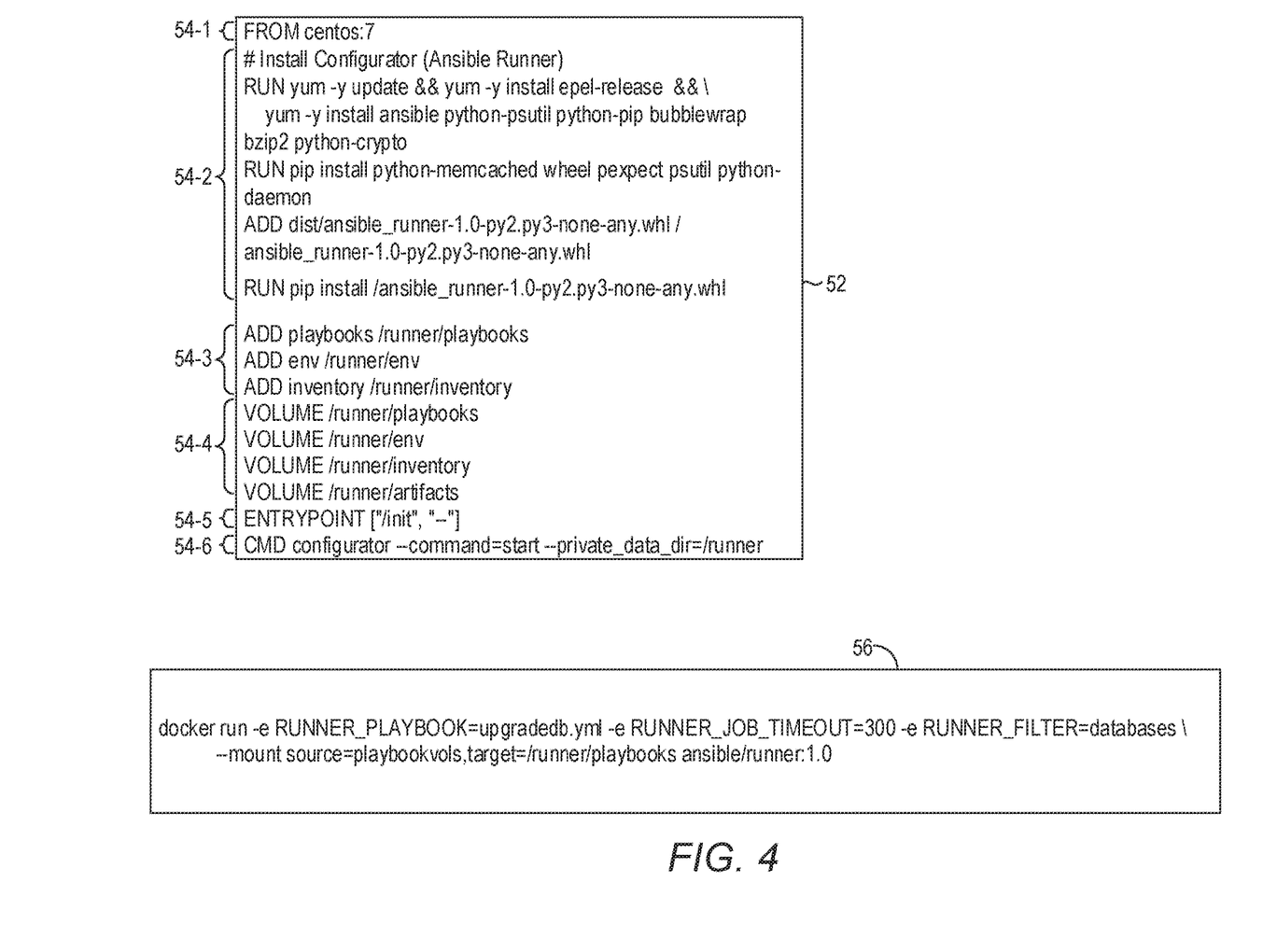
FIG. 4 is a block diagram illustrating the generation of a container image suitable for implementing the examples disclosed herein.

FIG. 4 is a block diagram illustrating a command file 52 for generating a container image 30 suitable for implementing the examples disclosed herein. In this example, the container image 30 is a Docker image, and the command file 52 is a Dockerfile, but the examples are not limited to Docker images and Dockerfiles. The command file 52 includes a Docker command 54-1 that identifies a base image. Commands 54-2 install the configurator codebase. Commands 54-3 identify various file directories that will be copied to the container image 30 as various layers of the container image 30, including an operational script layer that includes the plurality of operational scripts 36. The directories include, for example, operational scripts 36, credentials, and information that identifies the inventory of managed computing devices 38. Commands 54-4 identify various external mount points (e.g., "VOLUME") that may be mounted to a container 14 that is initiated from the container image 30. These mount points may be used to identify directories external to the container 14 that the configurator 42 can access when executing. Via the mount points, the configurator 42 can obtain data, such as the operational scripts 46, or other data, that is external to the container 14. The mount points allow many different aspects of the container 14 to be overridden at runtime of the container 14, such as, by way of non-limiting example, the particular operational script that will be executed, credentials that can be used, identification of which inventory can be configured, where output from the container 14 will be stored, and the like. Thus, the commands 54-4 eliminate the need to generate a different container image 30 each time a different operational script will be run, or a different credential used, or different inventory will be configured. Also via the mount points, the configurator 42 can store data external to the container 14, such as the logfile 44, which will persist after termination of the container 14.

A command 54-5 is used to initiate a parent task that merely serves to be a top node in a task tree associated with the container 14. A command 54-6 generates an execution layer that causes execution of the configurator 42, which is configured to receive the first runtime variable 40 that identifies a particular operational script 36 of the plurality of operational scripts 36, access the particular operational script 36, and perform the configuration actions identified in the particular operational script 36 on at least some of the plurality of managed computing devices 38, and then communicate, outside of the container 14, the output results that identify the outcome of the configuration actions.

In this example, the command 54-6 includes default variables that are provided to the configurator 42 at execution time, which can be overridden at container initiation time, as discussed above with regard to the first runtime variable 40 and the second runtime variable 48.

The command file 52 is used to generate the container image 30 via the Docker build command, which causes Docker to read the command file 52, and generate the container image 30 and various layers 34 based on the commands 54-1-54-6.

An example command 56 that may be used by the container orchestrator 24 to initiate a container 14 from the container image 30 is provided. The example command 56 is in the form of a Docker run command, and includes an environment variable "RUNNER_PLAYBOOK" with a value of "upgradedb.yml" which identifies the particular operational script 36 to execute. The example command 56 includes an environment variable "RUNNER_JOB_TIMEOUT" with a value of 300 which is used by the configurator 42 to set a timeout clock to 300 seconds. The example command 56 includes an environment variable "RUNNER_FILTER" with a value of "databases" to indicate to the configurator 42 that only database managed computing devices 38 should be configured. The example command 56 includes a "-mount" variable that identifies particular source volumes.

Figure 5:
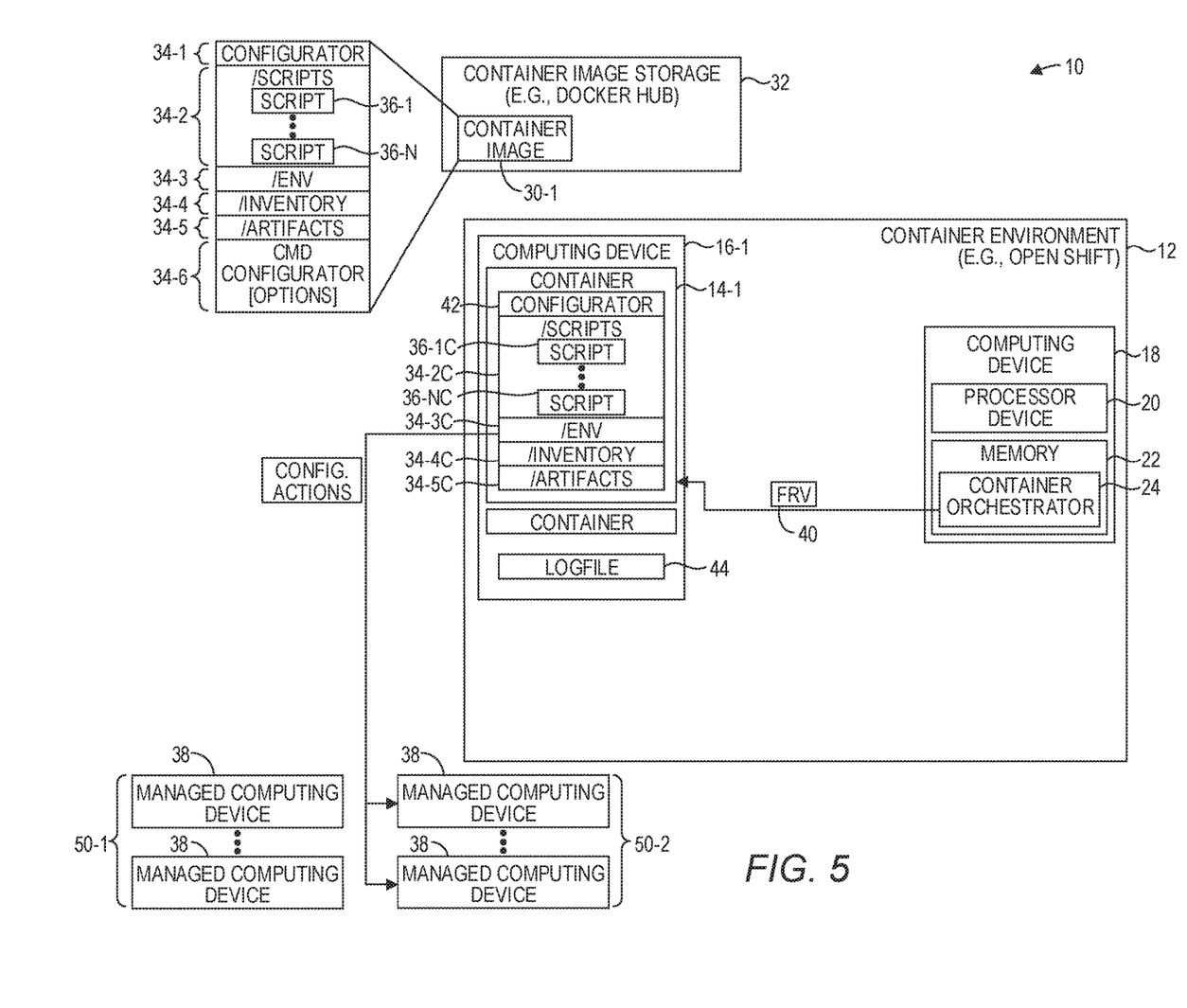
FIG. 5 is a simplified block diagram illustrating the environment illustrated in FIG. 1.

FIG. 5 is a simplified block diagram illustrating the environment 10 illustrated in FIG. 1. In this example, the computing device 18 includes the memory 22 and the processor device 20 coupled to the memory 22. The processor device 20 is to access the container image 30-1 from the container image storage 32, and initiate into the container environment 12, the container 14-1 from the container image 30-1 with the first runtime variable 40, which identifies the operational script 36-1 of the plurality of operational scripts 36. The operational script 36-1 identifies configuration actions to be performed on the plurality of managed computing devices 38.

The container image 30-1 includes the execution layer 34-6 that causes execution of the configurator 42. The configurator 42 is configured to receive the first runtime variable 40, access the operational script 36-1 identified by the first runtime variable 40, perform the configuration actions identified in the operational script 36-1 on at least some of the plurality of managed computing devices 38, and communicate, outside of the container 14-1, output results that identify an outcome of the configuration actions.

Figure 6:
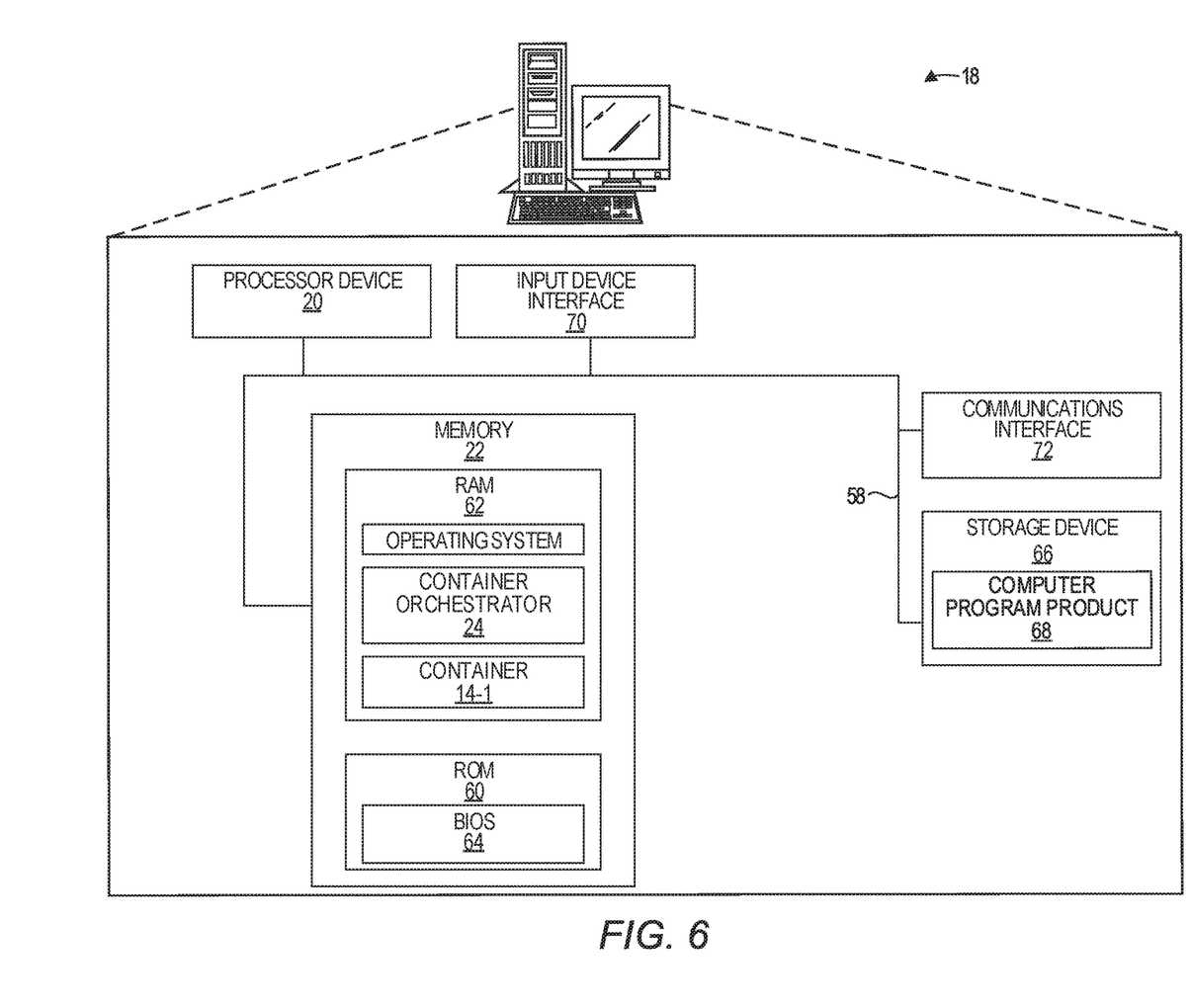
FIG. 6 is a block diagram of a computing device suitable for implementing examples according to one example.

FIG. 6 is a block diagram of the computing device 18 suitable for implementing examples according to one example. The computing device 18 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 18 includes the processor device 20, the memory 22, and a system bus 58. The system bus 58 provides an interface for system components including, but not limited to, the memory 22 and the processor device 20. The processor device 20 can be any commercially available or proprietary processor.

The system bus 58 may be any of several types of bus structures that may further interconnect to a memory bus (with or without a memory controller), a peripheral bus, and/or a local bus using any of a variety of commercially available bus architectures. The memory 22 may include non-volatile memory 60 (e.g., read-only memory (ROM), erasable programmable read-only memory (EPROM), electrically erasable programmable read-only memory (EEPROM), etc.), and volatile memory 62 (e.g., random-access memory (RAM)). A basic input/output system (BIOS) 64 may be stored in the non-volatile memory 60 and can include the basic routines that help to transfer information between elements within the computing device 18. The volatile memory 62 may also include a high-speed RAM, such as static RAM, for caching data.

The computing device 18 may further include or be coupled to a non-transitory computer-readable storage medium such as a storage device 66, which may comprise, for example, an internal or external hard disk drive (HOD) (e.g., enhanced integrated drive electronics (EIDE) or serial advanced technology attachment (SATA)), HDD (e.g., EIDE or SATA) for storage, flash memory, or the like. The storage device 66 and other drives associated with computer-readable media and computer-usable media may provide non-volatile storage of data, data structures, computer-executable instructions, and the like. Although the description of computer-readable media above refers to an HOD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 66 and in the volatile memory 62, including an operating system and one or more program modules, such as the container orchestrator 24, the container image 30-1, and/or the container 14-1, which may implement the functionality described herein in whole or in part.

All or a portion of the examples may be implemented as a computer program product 68 stored on a transitory or non-transitory computer-usable or computer-readable storage medium, such as the storage device 66, which includes complex programming instructions, such as complex computer-readable program code, to cause the processor device 20 to carry out the steps described herein. Thus, the computer-readable program code can comprise software instructions for implementing the functionality of the examples described herein when executed on the processor device 20. The processor device 20, in conjunction with the container orchestrator 24 in the volatile memory 62, may serve as a controller, or control system, for the computing device 18 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 20 through an input device interface 70 that is coupled to the system bus 58 but can be connected by other interfaces such as a parallel port, an Institute of Electrical and Electronic Engineers (IEEE) 1394 serial port, a Universal Serial Bus (USB) port, an IR interface, and the like.

The computing device 18 may also include a communications interface 72 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a computing device comprising a processor device, a container image from a container image storage;
   initiating, by the computing device, into a container environment, a first container from the container image with a first runtime variable, the first runtime variable identifying a first operational script of a first plurality of operational scripts, the first operational script identifying configuration actions to be performed on a plurality of managed computing devices;
   wherein the container image comprises:
      an execution layer that causes execution of a configurator, the configurator to:
         receive the first runtime variable;
         access the first operational script of the first plurality of operational scripts identified by the first runtime variable;
         perform the configuration actions identified in the first operational script on at least some of the plurality of managed computing devices; and
         communicate, outside of the first container, output results that identify an outcome of the configuration actions identified in the first operational script;
   initiating, by the computing device, into the container environment, a second container from the container image with a second runtime variable, the second runtime variable identifying a second operational script of the first plurality of operational scripts, the second operational script being different from the first operational script; and wherein the execution layer causes execution of the configurator, the configurator to:
receive the second runtime variable;
access the second operational script of the first plurality of operational scripts identified by the second runtime variable; and
perform configuration actions identified in the second operational script on at least some of the plurality of managed computing devices.

2. The method of claim 1 wherein:
the container image further comprises an operational script layer comprising the first plurality of operational scripts; and
the first runtime variable identifies the first operational script of the first plurality of operational scripts in the operational script layer.

3. The method of claim 1 wherein initiating the first container from the container image with the first runtime variable further comprises initiating the first container from the container image with the first runtime variable and a third runtime variable, the third runtime variable identifying a file directory outside of the first container that contains the first plurality of operational scripts.

4. The method of claim 1:
wherein the container image further comprises an operational script layer comprising a second plurality of operational scripts;
wherein initiating the first container from the container image with the first runtime variable further comprises initiating the first container from the container image with the first runtime variable and a third runtime variable, the third runtime variable identifying a file directory outside of the first container that contains the first plurality of operational scripts; and
wherein the first runtime variable identifies the first operational script of the first plurality of operational scripts in the file directory outside of the first container.

5. The method of claim 1 further comprising sending a message to a container orchestrator that directs the container orchestrator to initiate the first container from the container image with the first runtime variable.

6. The method of claim 1 wherein initiating the first container from the container image with the first runtime variable further comprises initiating the first container from the container image with the first runtime variable and a third runtime variable, the third runtime variable containing information that identifies a subset of computing devices of the plurality of managed computing devices, and wherein the configurator is configured to:
receive the first runtime variable and the third runtime variable;
access the first operational script of the first plurality of operational scripts identified by the first runtime variable;
perform the configuration actions identified in the first operational script on the subset of computing devices; and
communicate, outside of the first container, the output results that identify the outcome of the configuration actions identified in the first operational script.

7. The method of claim 1 wherein initiating the first container from the container image with the first runtime variable further comprises initiating the first container from the container image with the first runtime variable and a third runtime variable, the third runtime variable comprising authentication data required by the plurality of managed computing devices prior to allowing configuration actions to be performed against the plurality of managed computing devices, and wherein:
the configurator is configured to:
receive the first runtime variable and the third runtime variable;
access the first operational script of the first plurality of operational scripts;
provide the authentication data to the at least some of the plurality of managed computing devices;
perform the configuration actions identified in the first operational script on the at least some of the plurality of managed computing devices; and
communicate, outside of the first container, the output results that identify the outcome of the configuration actions identified in the first operational script.

8. The method of claim 1 wherein the first container is configured to communicate the output results that identify the outcome of the configuration actions identified in the first operational script in a persistent file that persists after termination of the first container.

9. The method of claim 1 further comprising:
generating the container image based on a command file, the container image comprising:
an operational script layer comprising the first plurality of operational scripts; and
the execution layer that causes the execution of the configurator that is to:
receive the first runtime variable that identifies the first operational script of the first plurality of operational scripts;
access the first operational script of the first plurality of operational scripts;
perform the configuration actions identified in the first operational script on the at least some of the plurality of managed computing devices; and
communicate, outside of the first container, the output results that identify the outcome of the configuration actions identified in the first operational script.

10. The method of claim 1 wherein the configuration actions identified in the first operational script comprise installing, on the at least some of the plurality of managed computing devices, a software package upgrade of a software package previously installed on the at least some of the plurality of managed computing devices, and wherein the first container is configured to, based on the first operational script:
connect to each respective managed computing device of the plurality of managed computing devices;
provide authentication information to each respective managed computing device that authenticates the first container to the respective managed computing device; and
upgrade the software package previously installed on the respective managed computing device.

11. The method of claim 1 wherein the plurality of managed computing devices comprises a plurality of network switches, and the configuration actions identified in the first operational script comprise installing, on at least some of the plurality of network switches, a corresponding network routing table, and wherein the first container is configured to, based on the first operational script:
connect to each respective network switch of the plurality of network switches;

provide authentication information to each respective network switch that authenticates the first container to the respective network switch; and install the network routing table on the respective network switch.

12. A computing device, comprising:

a memory; and a processor device coupled to the memory to:
- access a container image from a container image storage; and
- initiate, into a container environment, a first container from the container image with a first runtime variable and a second runtime variable, the first runtime variable identifying a first operational script of a first plurality of operational scripts, the first operational script identifying configuration actions to be performed on a plurality of managed computing devices, the second runtime variable containing information that identifies a subset of computing devices of the plurality of managed computing devices; and
- wherein the container image comprises:
  - an execution layer that causes execution of a configurator, the configurator configured to:
    - receive the first runtime variable and the second runtime variable;
    - access the first operational script of the first plurality of operational scripts identified by the first runtime variable;
    - perform the configuration actions identified in the first operational script on the subset of computing devices of the plurality of managed computing devices; and
    - communicate, outside of the first container, output results that identify an outcome of the configuration actions.

13. The computing device of claim 12:
- wherein the container image further comprises an operational script layer comprising a second plurality of operational scripts;
- wherein to initiate the first container from the container image with the first runtime variable, the processor device is further to initiate the first container from the container image with the first runtime variable and a third runtime variable, the third runtime variable identifying a file directory outside of the first container that contains the first plurality of operational scripts; and
- wherein the first runtime variable identifies the first operational script of the first plurality of operational scripts in the file directory outside of the first container.

14. The computing device of claim 12 wherein the processor device is further to initiate, into the container environment, a second container from the container image with a third runtime variable, the third runtime variable identifying a second operational script of the first plurality of operational scripts.

15. A computer program product stored on a non-transitory computer-readable storage medium and including instructions to cause a processor device to:
- access a container image from a container image storage; and
- initiate, into a container environment, a first container from the container image with a first runtime variable, the first runtime variable identifying a first operational script of a first plurality of operational scripts, the first operational script identifying configuration actions to be performed on a plurality of network switches, the configuration actions including installing, on at least some of the plurality of network switches, a corresponding network routing table; and
- wherein the container image comprises:
  - an execution layer that causes execution of a configurator, the configurator to:
    - receive the first runtime variable;
    - access the first operational script of the first plurality of operational scripts identified by the first runtime variable;
    - connect to each respective network switch of the plurality of network switches;
    - provide authentication information to each respective network switch that authenticates the first container to the respective network switch;
    - install the network routing table on the respective network switch; and
    - communicate, outside of the first container, output results that identify an outcome of the configuration actions.

16. The computer program product of claim 15:
- wherein the container image further comprises an operational script layer comprising a second plurality of operational scripts;
- wherein to initiate the first container from the container image with the first runtime variable, the instructions further cause the processor device to initiate the first container from the container image with the first runtime variable and a second runtime variable, the second runtime variable identifying a file directory outside of the first container that contains the first plurality of operational scripts; and
- wherein the first runtime variable identifies the first operational script of the first plurality of operational scripts in the file directory outside of the first container.

17. The computer program product of claim 15 wherein the instructions further cause the processor device to initiate, into the container environment, a second container from the container image with a second runtime variable, the second runtime variable identifying a second operational script of the first plurality of operational scripts.

* * * * *